United States Patent
Luo et al.

(10) Patent No.: US 6,859,210 B2
(45) Date of Patent: Feb. 22, 2005

(54) METHOD FOR REPRESENTING A DIGITAL COLOR IMAGE USING A SET OF PALETTE COLORS BASED ON DETECTED IMPORTANT COLORS

(75) Inventors: Jiebo Luo, Pittsford, NY (US); Qing Yu, Rochester, NY (US); Kevin E. Spaulding, Spencerport, NY (US)

(73) Assignee: Eastman Kodak Company, Rochester, NY (US)

( * ) Notice: Subject to any disclaimer, the term of this patent is extended or adjusted under 35 U.S.C. 154(b) by 224 days.

(21) Appl. No.: 09/900,564

(22) Filed: Jul. 6, 2001

(65) Prior Publication Data

US 2003/0011612 A1 Jan. 16, 2003

(51) Int. Cl.[7] .............................. G09G 5/02; G09G 5/00
(52) U.S. Cl. ...................................... 345/589; 345/581
(58) Field of Search ................................ 345/590, 597, 345/600, 581, 635, 603, 593, 589; 382/166

(56) References Cited

U.S. PATENT DOCUMENTS

| | | | | |
|---|---|---|---|---|
| 4,203,671 A | | 5/1980 | Takahashi et al. ........... 356/402 |
| 5,144,688 A | * | 9/1992 | Bovir et al. ................. 382/166 |
| 5,175,807 A | * | 12/1992 | Cawley et al. ............... 345/428 |
| 5,282,255 A | * | 1/1994 | Bovik et al. ................. 382/239 |
| 5,432,893 A | * | 7/1995 | Blasubramanian et al. . 345/600 |
| 5,459,486 A | * | 10/1995 | Iverson et al. ............... 345/593 |
| 5,544,284 A | | 8/1996 | Allebach et al. ............ 345/603 |
| 5,585,944 A | * | 12/1996 | Rodriguez .................. 358/500 |
| 5,588,069 A | * | 12/1996 | Katayama et al. .......... 382/166 |
| 5,710,833 A | | 1/1998 | Moghaddam et al. ........ 382/228 |
| 5,781,276 A | | 7/1998 | Zahn et al. .................... 355/41 |
| 6,253,220 B1 | * | 6/2001 | Le Beux et al. ............. 715/530 |
| 6,331,860 B1 | * | 12/2001 | Knox .......................... 345/620 |
| 6,385,337 B1 | * | 5/2002 | Klassen ....................... 382/166 |
| 6,625,306 B1 | * | 9/2003 | Marshall et al. ............. 382/162 |
| 2002/0163530 A1 | * | 11/2002 | Takakura et al. ........... 345/629 |

OTHER PUBLICATIONS

"A new vector quantization clustering algorithm", Equitz, IEEE Transactions on acoustics, speech, and signal processing, vol. 37, No. 10, Oct. 1989.*

"A New Approach to Palette Selection for Color Images" by R. Balasubramanian et al., Journal of Imaging Technology, vol. 17, No. 6, Dec. 1991.

"Quantization of Color Images Based on Uniform Color Spaces" by R. Gentile et al., Society for Imaging Science and Technology, 16, 11–21 (1990).

"Quantization and Multilevel Halftoning of Color Images for Near–Original Image Quality" by Ronald Gentile, J. Opt. Soc. Am. A, 1019–1026 (1990).

* cited by examiner

Primary Examiner—Michael Razavi
Assistant Examiner—Ryan Yang
(74) Attorney, Agent, or Firm—Raymond L. Owens

(57) ABSTRACT

Disclosed is a method for converting an input digital color image having a set of possible input colors to an output digital color image having a set of palette colors, the number of palette colors being less than the number of possible input colors, wherein the set of palette colors is determined based on the distribution of colors in the input digital image boosted by a distribution of important colors contained in the input digital image.

1 Claim, 4 Drawing Sheets

METHOD FOR REPRESENTING A DIGITAL COLOR IMAGE USING A SET OF PALETTE COLORS BASED ON DETECTED IMPORTANT COLORS

CROSS REFERENCE TO RELATED APPLICATIONS

Reference is made to commonly assigned U.S. patent application Ser. No. 09/900,565 filed Jul. 6, 2001 entitled "Method for Representing a Digital Color Image Using a Set of Palette Colors " by Kevin B. Spaulding et al., the disclosure of which is incorporated herein by reference.

FIELD OF THE INVENTION

This invention relates to the field of digital imaging, and more particularly to a method for representing a digital color image using a limited palette of color values.

BACKGROUND OF THE INVENTION

Many color image output devices are not capable of displaying all of the colors in an input digital image due to the fact that they must be stored in a memory buffer with a reduced bit-depth. Likewise, it may also be desirable to represent an image using a reduced bit-depth in order to reduce the amount of bandwidth needed for the transmission of an image, or the amount of memory needed to store an image. For example, many computers may use an 8-bit or a 16-bit color representation to store an image that is to be displayed on a soft-copy display such as a CRT or an LCD screen. Such representations allow only 256 and 65,536 unique color values, respectively. This is significantly less than the 16,777,216 possible color values associated with a typical 24-bit color image that is conventionally used in many digital imaging applications.

In applications where it is necessary to represent an input image using a reduced number of colors, it is necessary to determine the set of colors to be included in the reduced set of colors. In some cases, a reduced set of colors may be determined ahead of time independent of the particular image being encoded. For example, 3-bits of color information (8 different levels) may be used for the red and green channels of an image, and 2-bits of color information (4 different levels) may be used for the blue channel of an image. This produces a lattice of 8×8×4=256 different color values that can be used to represent the input image using an 8-bit representation. The input digital image can be converted to the 8-bit representation simply by taking the highest 2- or 3-bits of each of the corresponding RGB channels. The result is an image which has quantization errors that can produce visible contours in the image in many circumstances. One disadvantage of this method is that any particular image may not contain colors in all parts of color space. As a result, there may be some of the 256 color values that never get used. Consequently, the quantization errors are larger than they would need to be.

One method for minimizing the visibility of the quantization errors in the reduced bit-depth image is to use a multi-level halftoning algorithm to preserve the local mean of the color value. (For example see: R. S. Gentile, E. Walowit and J. P. Allebach, "Quantization and multilevel halftoning of color images for near original image quality," J. Opt. Soc. Am. A 7, 1019–1026 (1990).)

Another method for minimizing the visibility of the quantization errors in the reduced bit-depth image is to select the palette of color values used to represent each image based on the distribution of color values in the actual image. This avoids the problem of wasting color values that will never be used to represent that particular image. Examples of such image dependent palette selection methods include vector quantization schemes, such as those described in R. S. Gentile, J. P. Allebach and E. Walowit, "Quantization of color images based on uniform color spaces," J. Imaging Technol. 16, 11–21 (1990). These methods typically involve the selection of an initial color palette, followed by an iterative refinement scheme. Another approach, described in R. Balasubramanian and J. P. Allebach, "A new approach to palette selection for color images," J. Imaging Technol. 17, 284–290 (1991), starts with all of the colors of an image and groups colors into clusters by merging one nearest neighbor pair of clusters at a time until the number of clusters equals the desired number of palette colors. A third class of vector quantization algorithms uses splitting techniques to divide the color space into smaller sub-regions and selects a representative palette color from each sub-region. In general, splitting techniques are computationally more efficient than either the iterative or merging techniques and can provide a structure to the color space that enables efficient pixel mapping at the output. (For a description of several such splitting techniques, see commonly assigned U.S. Pat. No. 5,544,284.)

While vector quantization mechanisms can yield high quality images, they are very computationally intensive. A sequential scalar quantization method is set forth by Allebach et al. in U.S. Pat. No. 5,544,284. This method sequentially partitions a histogram representing the distribution of the original digital color image values into a plurality of sub-regions or color space cells, such that each partitioned color cell is associated with a color in the output color palette. This method has the advantage that it is generally more computationally efficient than vector quantization schemes.

Image dependent palette selection methods have the significant advantage that they assign the palette colors based on the distribution of color values in a particular digital image. Therefore, they avoid the problem of having palette color values that never get used for a particular image. The various methods will generally tend to select palette colors that are representative of the most commonly occurring colors in the particular image. This has the result of reducing the average quantization errors throughout the image. However, in some cases, there may still be large quantization errors in important image regions. For example, consider the case where an image contains the face of a person that only occupies a small image region. The number of pixels in the image that represent skin-tone colors may be relatively small, and therefore the likelihood that palette colors get assigned to skin-tone colors will be low. As a result, when the image is represented by the set of chosen palette colors, there may be objectionable contours in the face. Since this image region may be very important to an observer, these artifacts may be much more objectionable than they would have been if they had occurred in other image regions. Other types of image content where quantization artifacts may be particularly objectionable would include neutral image regions, and blue sky image regions. Existing image dependent palette selection techniques do not provide any mechanism for minimizing the quantization artifacts in these important image regions unless they are large enough in size to comprise a significant portion of the distribution of image colors.

SUMMARY OF THE INVENTION

It is an object of the present invention to provide an improved method for palette selection which minimizes quanitization artifacts for selected important colors.

This object is achieved by a method for converting an input digital color image having a set of possible input colors to an output digital color image having a set of palette colors, the number of palette colors being less than the number of possible input colors, wherein the set of palette colors is determined based on the distribution of colors in the input digital image boosted by a distribution of important colors contained in the input digital image. This is accomplished using the steps of determining the distribution of colors in the input digital color image, detecting regions of important colors in the input digital color image, boosting the distribution of colors in the input digital color image in response to the detected regions of important colors, determining the set of palette colors to be used in the formation of the output digital color image responsive to the boosted distribution of colors, and forming the output digital color image by assigning each color in the input digital color image to one of the colors in the set of palette colors.

ADVANTAGES

The present invention has the advantage that the set of palette colors that are determined will emphasize important colors whether or not the important colors occupy a large area of the input image. The present method provides more esthetically pleasing images to a viewer.

It has the further advantage that any conventional image-dependent palettization algorithm, such as sequential scalar quantization or vector quantization, can be used in accordance with the present invention by simply appending additional pixels to the input image, where the additional pixels are determined from the detected regions of important colors in the input digital color image.

DETAILED DESCRIPTION OF THE INVENTION

Figure 1:
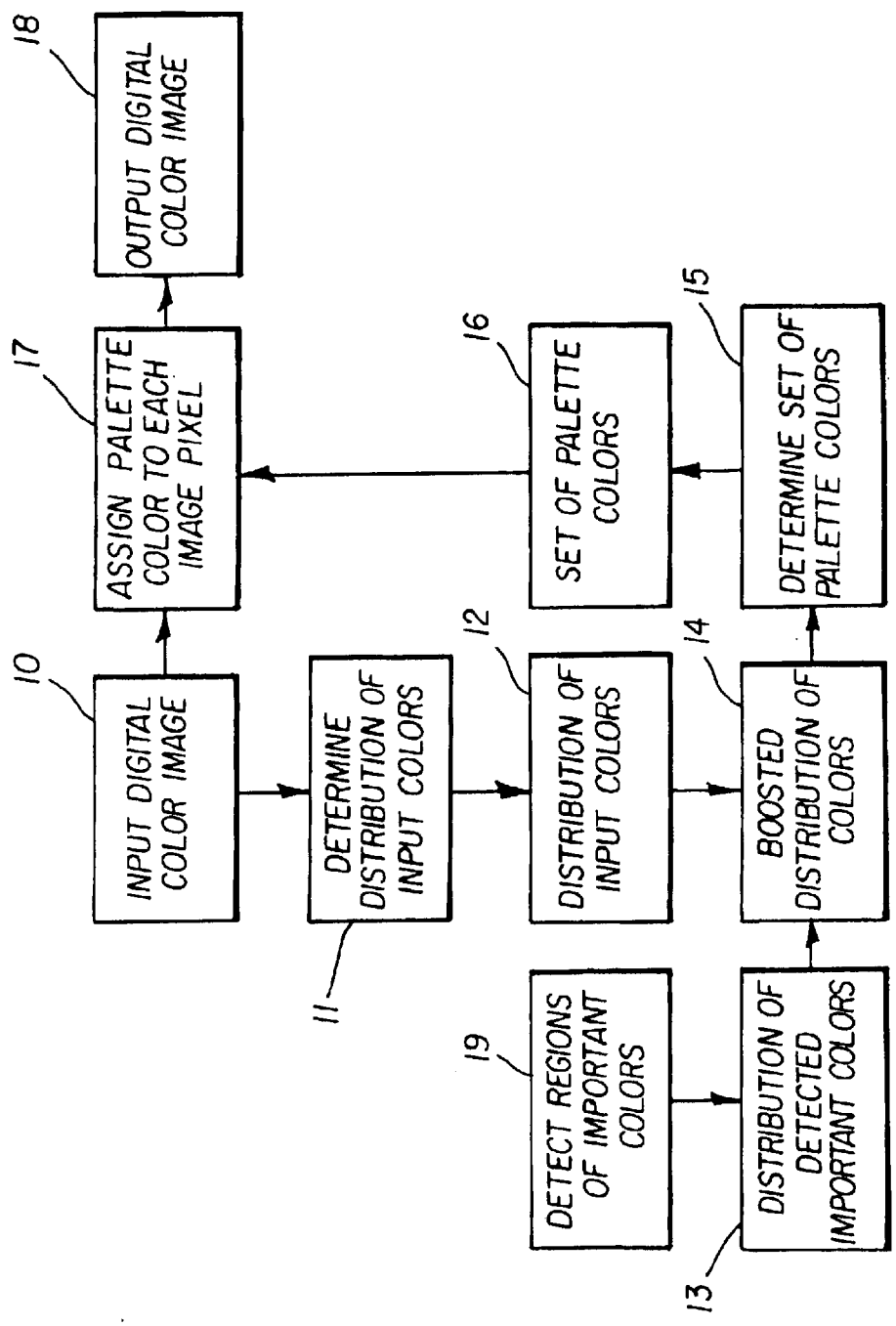
FIG. 1 is a flow diagram illustrating the method of the present invention.

A flow diagram illustrating the basic method of the present invention is shown in FIG. 1. The method operates on an input digital color image 10 having a set of possible input colors. The set of possible input colors will be defined by the color encoding of the input digital color image 10. Typically the input digital color image 10 might be a 24-bit RGB color image having $2^{24}$=16,777,216 different colors. However, it will be recognized that the invention is not limited to this configuration. Alternatively, the input digital color image 10 could be at some other bit-depth, or could be in some other color space such as $YC_RC_B$ or CIELAB. A determine distribution of input colors step 11 is used to determine the distribution of input colors 12. In a preferred embodiment of the present invention, the distribution of the input colors is determined by forming a three-dimensional histogram of color values.

Next, the distribution of input colors 12 is boosted by a distribution of important colors 13 detected in the input color image to form a boosted distribution of colors 14. The distribution of important colors is obtained from a detect regions of important colors step 19. A determine set of palette colors step 15 is then used to determine a set of palette colors 16 responsive to the boosted distribution of colors 14. Since the boosted distribution of colors 14 has been boosted by the distribution of important colors 13, the set of palette colors will contain more colors in the important color regions than would otherwise be the case if the determine set of palette colors step 15 had been applied to the original distribution of input colors 12. The number of colors in the set of palette colors 16 will be less than the number of possible input colors. In a preferred embodiment of the present invention, the number of palette colors will be 256 corresponding to the number of different colors that can be represented with an 8-bit color image. However, it will be obvious to one skilled in the art that the method can be generalized to any number of palette colors. For example, if the output image were a 4-bit color image, the number of corresponding output colors would be 16, or if the output image were a 10-bit color image, the number of corresponding palette colors would be 1024.

Once the set of palette colors 16 has been determined, an assign palette color to each image pixel step 17 is used to form an output digital color image 18. The output digital color image 18 will be comprised entirely of colors chosen from the set of palette colors. Generally, the palette color for each pixel of the image will be identified by an index value indicating which palette color should be used for that pixel. For example, if there are 256 palette colors used for a particular image, each pixel of the output image can be represented by an 8-bit number in the range 0–255. The output digital color image 18 will generally be stored in a digital memory buffer, or in a digital image file. In order to properly display the image, a palette index indicating the color value for each of the different palette colors needs to be associated with the image. When the image is displayed, the palette index can be used to determine the corresponding color value for each of the palette colors.

The steps in the method of FIG. 1 will now be discussed in more detail. The determine distribution of input colors step 11 can take many forms. In a preferred embodiment of the present invention, a three-dimensional histogram of the input colors of the input digital color image is computed. One way that the histogram of input color values can be computed is to go through each pixel of the input image and count the number of occurrences of each input color. To limit the number of bins in the histogram of input colors, ranges of input color values can be grouped into a single bin. For example, instead of 256 different bins for the red dimension, a smaller number of bins such as 32 or 64 could be used.

Additionally, to speed up the computation of the histogram of input colors, it may be desirable to sub-sample the pixels in the input image. For example, instead of examining every image pixel, only the pixels in every $10^{th}$ row and every $10^{th}$ column could be used to form the histogram of input colors. In some cases, it might be desirable to convert the image to some other color space before determining the histogram of input colors. For example, an RGB image could be converted to a $YC_RC_B$ luminance-chrominance representation. This is advantageous for some types of palette determination algorithms. This also makes it possible to use different bin sizes for the luminance and chrominance color channels.

There are many examples of sets of important colors that could be used with the method of the present invention. Generally, the important colors should be chosen or selected to be colors that are of high importance to a human observer. Colors that are likely to appear in smoothly varying image regions are particularly critical since they will be most likely to suffer from image quality degradations resulting from quantization errors. Skin-tone colors are an example of colors that might be included in the set of important colors. Not only are skin-tone colors very important to image quality as judged by a human observer, but additionally, they usually occur as slowly varying gradients in an image. There are many different variations of skin-tone colors corresponding to different races and complexions, as well as to variations in the illumination characteristics of the scene. In this case, the distribution of important colors should generally reflect the expected variations in the skin-tone colors. Other colors that might be included in the distribution of important colors for some applications would be neutral colors and sky colors. In many applications, quantization errors in these regions might be particularly visible and/or objectionable.

There are several methods that could be used to determine the boosted distribution of colors 14. For example, a histogram of important colors is computed from regions detected as having important colors and then combined with the histogram determined to represent the distribution of input colors. In this case, the boosted distribution of colors 14 could be determined by simply adding the histogram of detected important colors to the histogram of input colors to form a boosted histogram. Alternatively, a weighted combination of the histogram of important colors and the histogram of input colors could be used to adjust the relative weight assigned to the two histograms.

Another approach for determining the boosted distribution of colors 14 is to append additional pixels to the input digital color image to form an enlarged input digital color image. The additional pixels that are appended to the image are duplicated from regions detected as having important colors. The boosted distribution of colors can then be determined by simply determining the distribution of colors in the enlarged input digital color image. The additional pixels can be provided in the form of a target image that can be appended to the image. This target image contains color patches determined (e.g., most conveniently, through directly duplication) from the detected regions of important colors in the input color digital image. Generally, it may be desirable to resize the target image before appending it to the input digital color image. For example, it will typically be more convenient to combine the two images if the width of the target image is adjusted to match the width of the input digital color image.

Figure 2:
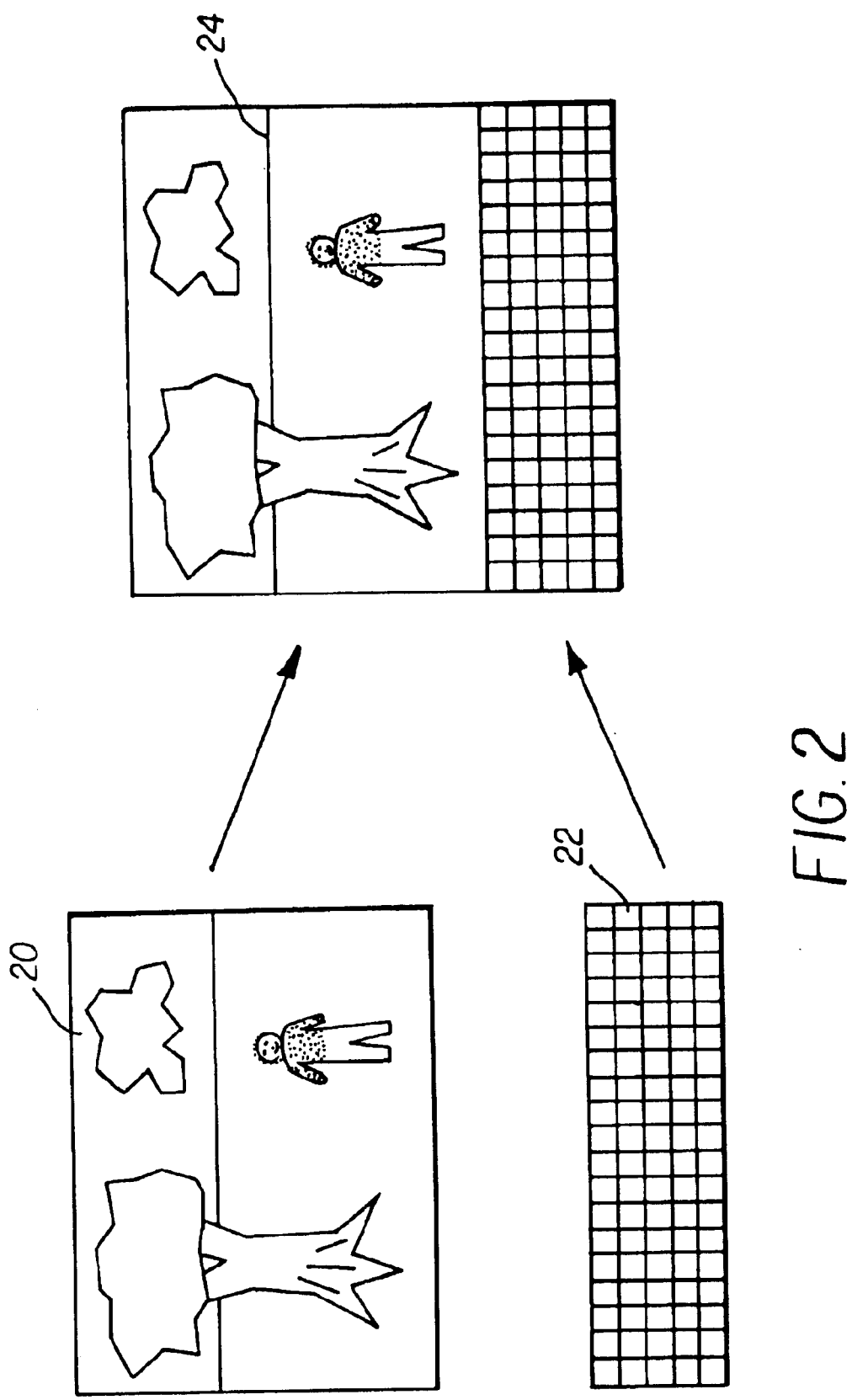
FIG. 2 is a diagram showing the process of appending additional pixels to the input digital color image.

This method is illustrated in FIG. 2. An input image 20 is shown which includes a person occupying a relatively small region of the image. A conventional palettization method would assign very little weight to the skin-tone colors since they make up a statistically small portion of the image. However, the colors in the input image are boosted by appending additional pixels 22 to the image to form an enlarged image 24. These additional pixels are determined (e.g., most conveniently, through directly duplication) from regions detected as having important colors. The boosted distribution of colors 14 can then be computed directly from the enlarged image 24, rather than having to combine the distribution of input colors 12 and a separate distribution of important colors 13. When the set of palette colors 16 is determined based on this boosted distribution of colors 14, more palette colors will be assigned in the skin-tone region of color space, and therefore the quantization artifacts for these important colors will be reduced.

Figure 5:
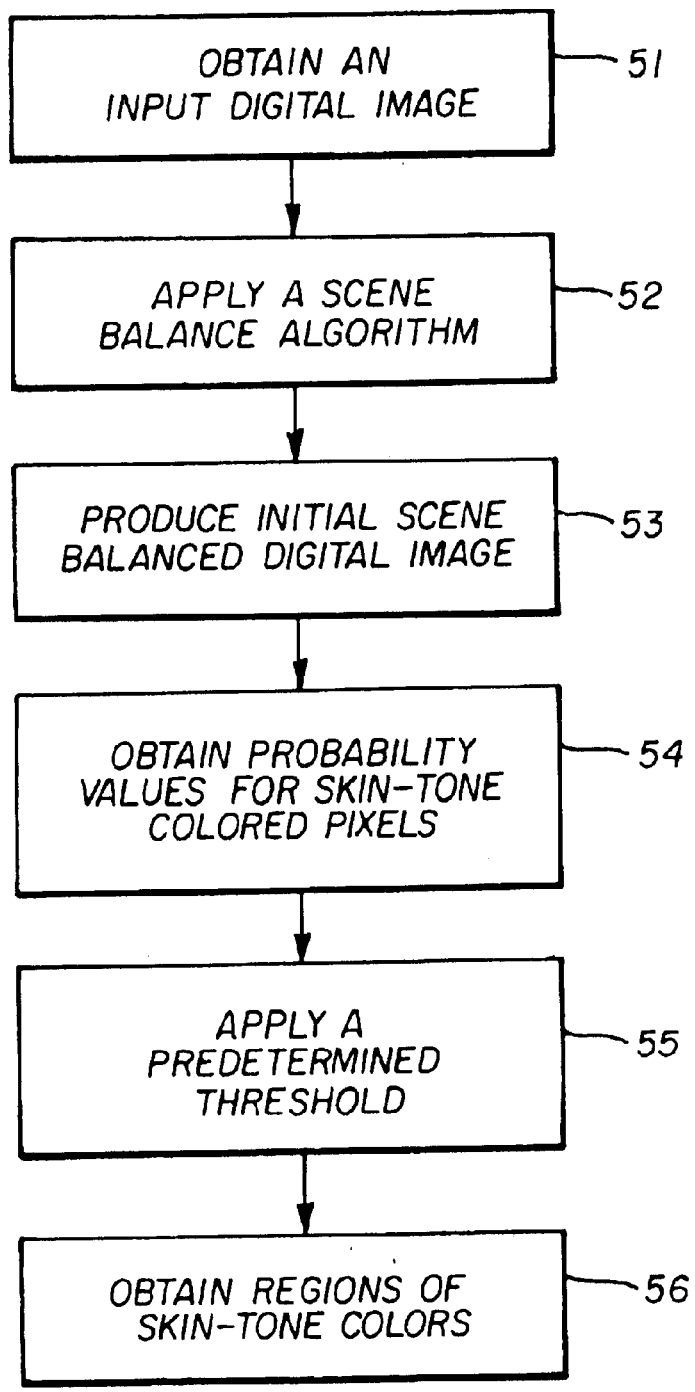
FIG. 5 is a block diagram showing a skin-tone colored region detection algorithm.

Referring to FIG. 5, one method that can be used with the present invention for implementing the detect regions of important colors step 19 is illustrated. First, an input digital image is obtained using an obtain input digital image step 51. This input digital image is then processed using an apply scene balance algorithm step 52 to obtain an estimate of the appropriate color balance of the image using a conventional scene balance algorithm. Next, a produce initial scene balanced digital image step 53 is used to apply any necessary corrections to the input digital image. The scene-balanced digital image is then processed by an obtain probability values for skin-tone colored pixels step 54. An apply predetermined threshold step 55 is then applied to the probability values, followed by an obtain regions of skin tone colors step 56. The regions of detected skin-tone colors can then be used to define the distribution of important colors 13 that occur in the particular input image.

One method that can be used for the obtain regions of skin-tone colored pixels step 54 is more completely described in the following. The pixel RGB values are converted to "Lst" coordinates by the following equations:

$$L=(R+G+B)/sqrt \tag{3}$$

$$s=(R-B)/sqrt \tag{2}$$

$$t=(2G-R-B)/sqrt \tag{6}$$

For each pixel in the input color digital image, the probability that it is a skin-tone pixel is computed. The probability is derived from its coordinates in the Lst space, based on predetermined skin-tone probability functions. These probability functions were constructed based on collection of data for the color-space distributions of skin and non-skin regions in a large collection of scene balanced images. The conditional probability that a pixel is a skin-tone pixel given its Lst coordinates is:

$$Pr(Skin|L,s,t)=Pr(Skin|L)*Pr(Skin|s)*Pr(Skin|t)$$

where each of the conditional distributions Pr(Skin|L), Pr(Skin|s), and Pr(Skin|t) are constructed by application of Bayes Theorem to the original training distributions for skin and non-skin pixels. In comparison, there are other conventional methods for detecting skin-tone colored pixels, e.g., U.S. Pat. No. 4,203,671 to Takahashi, and U.S. Pat. No. 5,781,276 to Zahn, use the likelihood probability of P(color|Skin). However, one drawback of using the conventional likelihood probability is that the probability distribution of non skin-tone pixels is not accounted for. Consequently, there is a higher likelihood for false detection. The collection of probabilities for all pixels forms a skin-tone probability distribution for the input image. The skin-tone probability distribution is thresholded to create a binary map such that each pixel is designated as either skin-tone or non skin-tone. Alternatively, a face detection algorithm can be used to find human face regions in the input color digital image. Regions of skin-tone colors are then extracted from the detected face regions. For a description of a face detection method, see U.S. Pat. No. 5,710,833 to Moghaddam and Pentland.

The advantage of appending additional pixels to the image for the purpose of computing the boosted distribution of colors 14 rather than simply combining the histogram of important colors and the histogram of input colors is that this method can be implemented without needing to modify the algorithm that is used to determine the set of palette colors. For example, if the algorithm were only available as a compiled executable software module, then it would be possible to practice the method of the present invention by simply including a pre-processing step of appending the additional image pixels to the input image before running the software module, and a post-processing step to strip the additional pixels off of the processed output image created by the software module.

There are many different methods that could be used for the determine set of palette colors step 15. In a preferred embodiment of the present invention, a sequential scalar quantization technique such as that described by Allebach et al. in U.S. Pat. No. 5,544,284 is used. This approach works by sequentially partitioning the colors of the boosted distribution of colors 14 into a set of color space regions. This is generally done on a luminance-chrominance representation of the image. The set of palette colors 16 is then determined by selecting an output color for each color space region in the set of color space regions. For more details of this method, reference should be made to the above-mentioned U.S. Pat. No. 5,544,284.

Other methods that could be used for the determine set of palette colors step 15 include a wide variety of vector quantization techniques. Several examples of these methods are discussed in U.S. Pat. No. 5,544,284. It will be obvious to one skilled in the art that the method of the present invention can easily be used with any image palettization technique where the selected palette colors are dependent on the distribution of colors in the input image.

Once the set of palette colors 16 is determined, the assign palette color to each image pixel step 17 is used to form an output digital color image 18. One manner in which this step can be implemented is to determine the palette color having the smallest color difference relative to the color of each pixel of the input digital color image.

Figure 3:
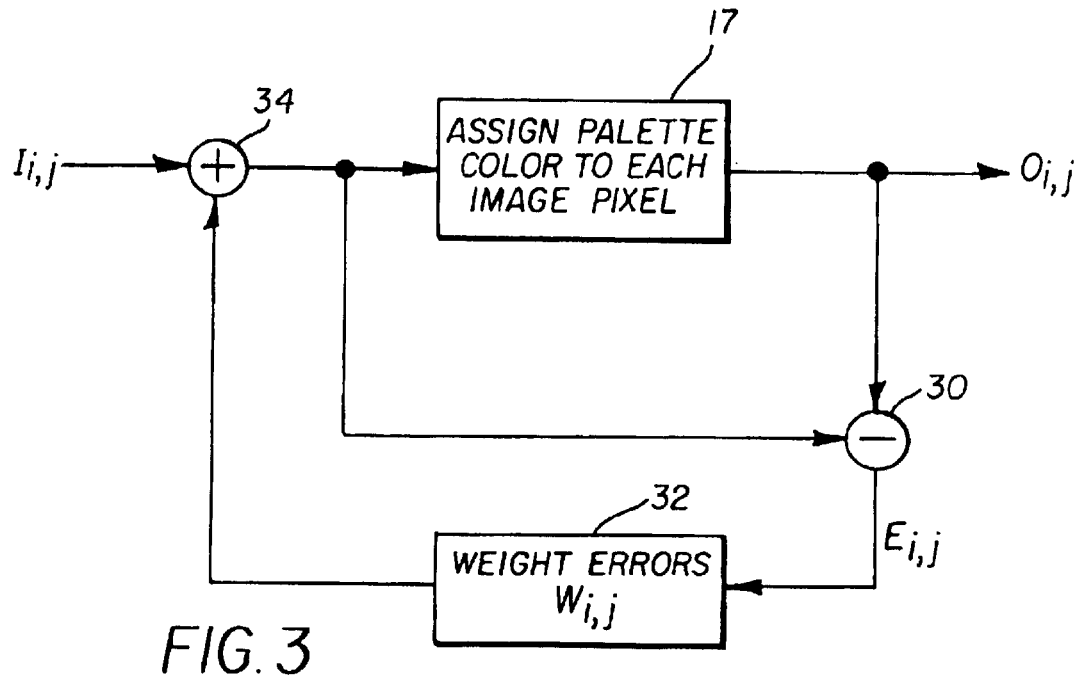
FIG. 3 is a diagram showing a multi-level vector error diffusion algorithm.
Figure 4:
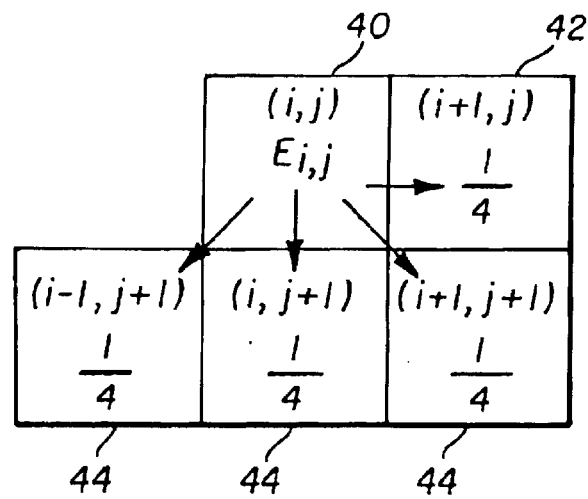
FIG. 4 shows an example set of error weights that can be used for a multi-level vector error diffusion algorithm.

In a variation of the present invention, the assign palette color to each image pixel step 17 includes the application of a multi-level halftoning algorithm. Multi-level halftoning algorithms can be used to create the appearance of color values intermediate to the palette colors by varying the palette values assigned to the pixels of the output digital color image 18 such that the local mean color value is approximately preserved. An example of a multi-level halftoning method that could be used would be multi-level vector error diffusion. A flow diagram illustrating a typical multi-level vector error diffusion algorithm is shown in FIG. 3. In this figure, an input pixel color value $I_{ij}$ from the $i^{th}$ column and $j^{th}$ row of the input digital color image 10 is processed by an assign palette color to each image pixel step 17 to form a corresponding output pixel color value $O_{ij}$ of the output digital color image 18. The assign palette color to each image pixel step 17 introduces a quantization error due to the fact that the output pixel value is selected to be one of the palette colors in the determined set of palette colors 16. A difference operation 30 is used to compute a color error $E_{ij}$ representing the vector difference between the input pixel color value $I_{ij}$ and the output pixel color value $O_{ij}$. A weight errors step 32 is used to apply a series of error weights $W_{ij}$ to the resulting color error $E_{ij}$. A sum operation 34 is then used to add the weighted color errors to nearby input pixels that have yet to be processed. An example set of error weights $W_{ij}$ is shown in FIG. 4. In this example, the color error $E_{ij}$ for the current pixel 40 with column and row address (i, j) is weighted by a factor of ¼ and distributed to the next pixel to the right 42 in the current row of the image having the column and row address (i+1, j). Likewise the color error $E_{ij}$ is also weighted by factors of ¼ and distributed to three pixels in the next row of the image 44 having column and row addresses (i−1, j+1), (i, j+1) and (i+1, j+1). In this way, the quantization errors introduced when processing the current pixel 40 are distributed to nearby input pixels that have not yet been processed. The result is that the local mean color value is approximately preserved.

The subject matter of the present invention relates to digital image understanding technology, which is understood to mean technology that digitally process a digital image to recognize and thereby assign useful meaning to human understandable objects, attributes or conditions and then to utilize the results obtained in the further processing of the digital image.

A computer program product may include one or more storage medium, for example; magnetic storage media such as magnetic disk (such as a floppy disk) or magnetic tape; optical storage media such as optical disk, optical tape, or machine readable bar code; solid-state electronic storage devices such as random access memory (RAM), or read-only memory (ROM); or any other physical device or media employed to store a computer program having instructions for controlling one or more computers to practice the method according to the present invention.

The invention has been described in detail with particular reference to certain preferred embodiments thereof, but it will be understood that variations and modifications can be effected within the spirit and scope of the invention.

| PARTS LIST | |
|---|---|
| 10 | input digital color image |
| 11 | determine distribution of input colors step |
| 12 | distribution of input colors |
| 13 | distribution of important colors |
| 14 | boosted distribution of colors |
| 15 | determine set of palette colors step |
| 16 | set of palette colors |
| 17 | assign palette color to each image pixel step |
| 18 | output digital color image |
| 19 | detect regions of important colors step |
| 20 | input image |
| 22 | additional pixels |
| 24 | enlarged image |
| 30 | difference operation |
| 32 | weight errors step |
| 34 | sum operation |
| 40 | current pixel |
| 42 | next pixel to the right |
| 44 | pixels in next row of image |
| 51 | obtain input digital image step |
| 52 | apply scene balance algorithm step |
| 53 | produce initial scene balanced digital image step |
| 54 | obtain probability values for skin colored pixels step |
| 55 | apply a predetermined threshold step |
| 56 | obtain regions of skin-tone colors step |

What is claimed is:

1. A method for converting an input digital color image having a set of possible input colors to an output digital color image having a set of palette colors, the number of palette colors being less than the number possible input colors, wherein the set of palette colors is determined based on the distribution of colors in the first digital image boosted by a distribution of the pre-defined important colors contained in the input digital image, comprising the steps of:

a) appending additional pixels to the input digital color image to form an enlarged input digital color image, where the additional pixels are determined from detected regions of the pre-defined important colors in the input digital color image;

b) determining the distribution of colors in the enlarged input digital color image;

c) determining the set of palette colors to be used in the formation of the output digital color image responsive to the distribution of colors in the enlarged input digital color image;

d) forming an enlarged output digital color image by assigning each color in the enlarged input digital color image to one of the colors in the set of palette colors; and e) forming an output digital color image by removing the additional pixels from the enlarged output digital color image.

* * * * *